United States Patent [19]

Yamaba

[11] Patent Number: 4,834,541
[45] Date of Patent: May 30, 1989

[54] COLOR SENSOR

[75] Inventor: Kazuo Yamaba, Tsukuba, Japan

[73] Assignees: Agency of Industrial Science & Technology; Ministry of International Trade & Industry, both of Tokyo, Japan

[21] Appl. No.: 146,388

[22] Filed: Jan. 21, 1988

[30] Foreign Application Priority Data

Jan. 22, 1987 [JP] Japan .................................. 62-12850

[51] Int. Cl.$^4$ ............................................... G01J 3/50
[52] U.S. Cl. .................................... 356/406; 250/226; 356/407; 356/419; 356/425
[58] Field of Search ............... 356/405, 406, 407, 425, 356/419, 414; 250/226

[56] References Cited

U.S. PATENT DOCUMENTS 4,547,074 10/1985 Hinoda et al. ...................... 356/405

Primary Examiner—F. L. Evans
Attorney, Agent, or Firm—Oblon, Fisher, Spivak, McClelland & Maier

[57] ABSTRACT

A color sensor makes a color distinction based on outputs from three primary optical sensing devices for receiving light having three primary colors under a fluorescent lamp by calculating a relative composition ratio of the three primary colors in an integrator. The operation of the integrator is controlled by a pulse generated by detecting a peak value of the light based on an output from a complementary optical sensing device sensitive to visible light.

2 Claims, 3 Drawing Sheets

FIG.4
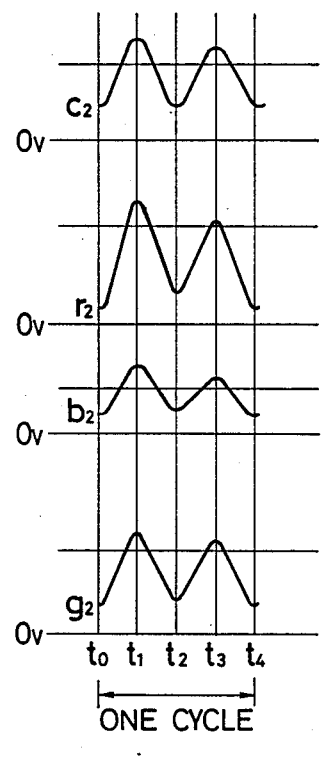
FIG.5(a)
FIG.5(b)
FIG.5(c)
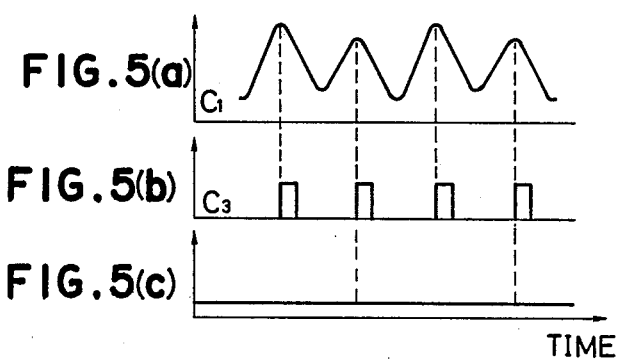

COLOR SENSOR

BACKGROUND OF THE INVENTION

1. Field of the Invention

This invention relates to a color sensor capable of performing data processing for distinguishing a color at high speed under a light source having a flicker such as a fluorescent lamp.

2. Prior Art Statement

A conventional color sensor utilizing a tristimulus value direct reading method which has been generally used, must have an exclusive standard light source. In this color sensor, the color distinction is made in the state that extraneous light is blocked to some extent or an object is illuminated by a standard light source brighter than the extraneous light, such as a light source, for example, of 2,000 lux against an extraneous light of 500 lux.

However, since the conventional color sensor requires an exclusive standard light source as described above, it is very difficult for the conventional color sensor to be used on an actual production line. Therefore, a color sensor which can be used under a fluorescent lamp ordinarily used as factory illumination, is strongly demanded.

The present inventor has proposed a color distinction device capable of solving the above-mentioned problem and improving the capability of distinguishing red-purple colors (Japanese Patent Public Disclosure No. SHO 61(1986)-262623, U.S. patent application Ser. No. 4,766,702. The proposed color distinction device comprises optical sensing devices sensitive to three primary colors of red, green and blue respectively, and a complementary sensor. In this device, the capability of distinguishing colors is improved by using an output from the complementary sensor.

However, when the color sensing is performed at high speed under a fluorescent lamp used as industrial illumination, the flicker of light due to the frequency of an electric power source of a fluorescent lamp offers a large interference. In the above-mentioned color distinction device, an electric filter circuit is used in order to remove an influence of flicker due to the frequency of an electric power source of a fluorescent lamp. Although a correct color distinction can be made if the filter circuit is employed, the circuit takes a comparatively long time for processing, i.e., usually 2 or 3 seconds. Therefore, sometimes the color sensing is unable to cope with the high speed of the production line. That is, since the relative composition ratio of the three primary colors is changed by the timing for processing the three primary colors it fails to make a correct color distinction, and the filter is connected to a rear part of a current to voltage converter (an I/V converter) to obtain a direct current signal in order to remove undesired influence due to the flicker. However, since the processing time for the filter according to this method requires 2 to 3 seconds, high speed distinction is difficult to obtain.

Therefore, if a method for eliminating the flicker at high speed can be established, a correct color distinction can be made in the above-proposed device even if the speed of the production line is comparatively high.

OBJECT AND SUMMARY OF THE INVENTION

The object of the present invention is to provide a color sensor, in which a color distinction can be made at high speed under a fluorescent lamp which flickers at a low frequency.

In order to achieve the above-mentioned object, a color sensor of the present invention comprises three optical filters having a peak at a red color wavelength, green color wavelength and blue color wavelength respectively, three primary optical sensing devices for receiving light passed through said optical filters and one complementary optical sensing device sensitive to a visible light, each of the primary optical sensing devices being provided with an integrator for performing an integrating operation by a trigger pulse generated based on an output of the complementary optical sensing device and adder and divider means for outputting, as a color distinction item, the composition ratio of the three primary colors based on the output from the integrators.

When each optical sensing device is placed opposite to an object under a light source having a flicker such as a fluorescent lamp, a trigger pulse is generated in synchronism with the peak of the brightness of the light source by an output of the complementary optical sensing device and every time the trigger pulse is generated, the output from each primary optical sensing device is made smooth in each integrator connected to each primary optical sensing device. Further, the composition ratio of the three primary colors is calculated from the output of each integrator in the adder and divider means. Color distinction is made by comparing such obtained composition ratio with a composition ratio of a reference color recorded beforehand.

As described in the foregoing, by adequately controlling each integrator connected to each primary optical sensing device so that the integrator performs the integrating operation at a peak value of a light source, the output from the integrator can be made smooth. As a result, a correct color distinction can be made at high speed.

The above and other objects and features of the invention will become more apparent from the following detailed description with reference to the accompanying drawings.

BRIEF DESCRIPTION OF THE DRAWINGS

FIG. 4 is a graph illustrating output waveforms of the optical sensing devices under a fluorescent lamp;

FIG. 5 (a) is an illustration of a waveform of an output from a complementary optical sensing device of the color sensor;

FIG. 5 (b) is an illustration of a waveform of a trigger pulse from a pulse generator; and FIG. 5 (c) is an illustration of a smooth waveform of an output from an integrator.

DETAILED DESCRIPTION OF THE PREFERRED EMBODIMENT

Figure 1:
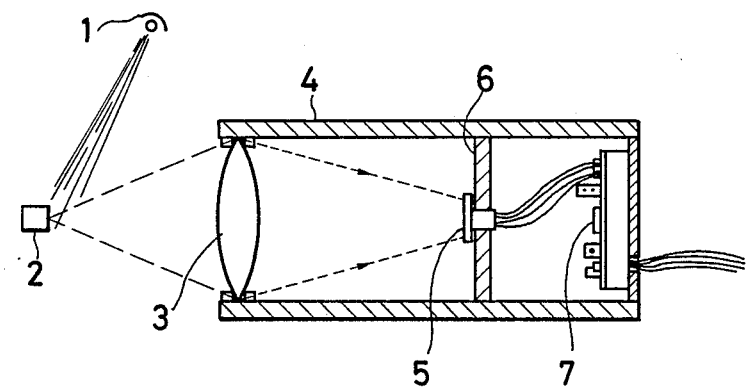
FIG. 1 is an explanatory view illustrating color distinction made by a color sensor of the present invention.

FIG. 1 illustrates one embodiment of a configuration of a color distinction using a color sensor according to the present invention. The light reflecting from an object 2 radiated by a fluorescent lamp 1 is condensed by a condenser lens 3 disposed at an opening of a sensor housing 4 with a black and non-shining inner wall and enters a group 5 of optical sensing devics on a supporting table 6 disposed at a focal position of the lens 3 within the housing 4.

Figure 2:
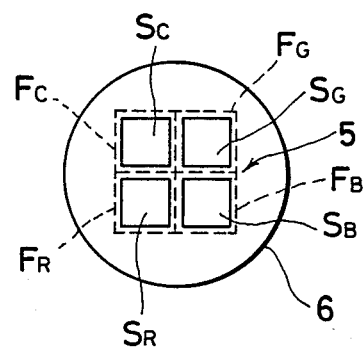
FIG. 2 is an explanatory view showing one example of an arrangement of optical sensing devices in the color sensor.

The optical sensing device group 5, as shown in FIG. 2, comprises three primary optical sensing devices $S_R$, $S_G$ and $S_B$, and one complementary optical sensing device $S_C$ all disposed on the supporting table 6. Filters $F_R$, $F_G$ and $F_B$ are provided to face the three primary optical sensing devices $S_R$, $S_G$ and $S_B$, respectively, and a filter $F_C$ for intercepting infrared light is provided to face the complementary optical sensing device $S_C$. The filter $F_R$ is formed of an optical filter having a peak in red color wavelength and a filter for intercepting infrared light which overlap each other. Similarly, the filters $F_G$ and $F_B$ are formed by overlapping optical filters having peaks in green color wavelength and blue color wavelength respectively and filters for intercepting infrared light, respectively.

As the above-mentioned optical sensing devices (photoelectric converting elements), there are desirably used such elements which have a spectral characteristic similar to a human visibility. One example of such elements is a high speed type PIN photodiode. If these optical sensing devices $S_R$, $S_G$, $S_B$ and $S_C$ are sensitive only to visible light, each of the filters $F_R$, $F_G$, $F_B$ may be formed of an optical filter alone, and the filter $F_C$ may be removed.

Figure 3:
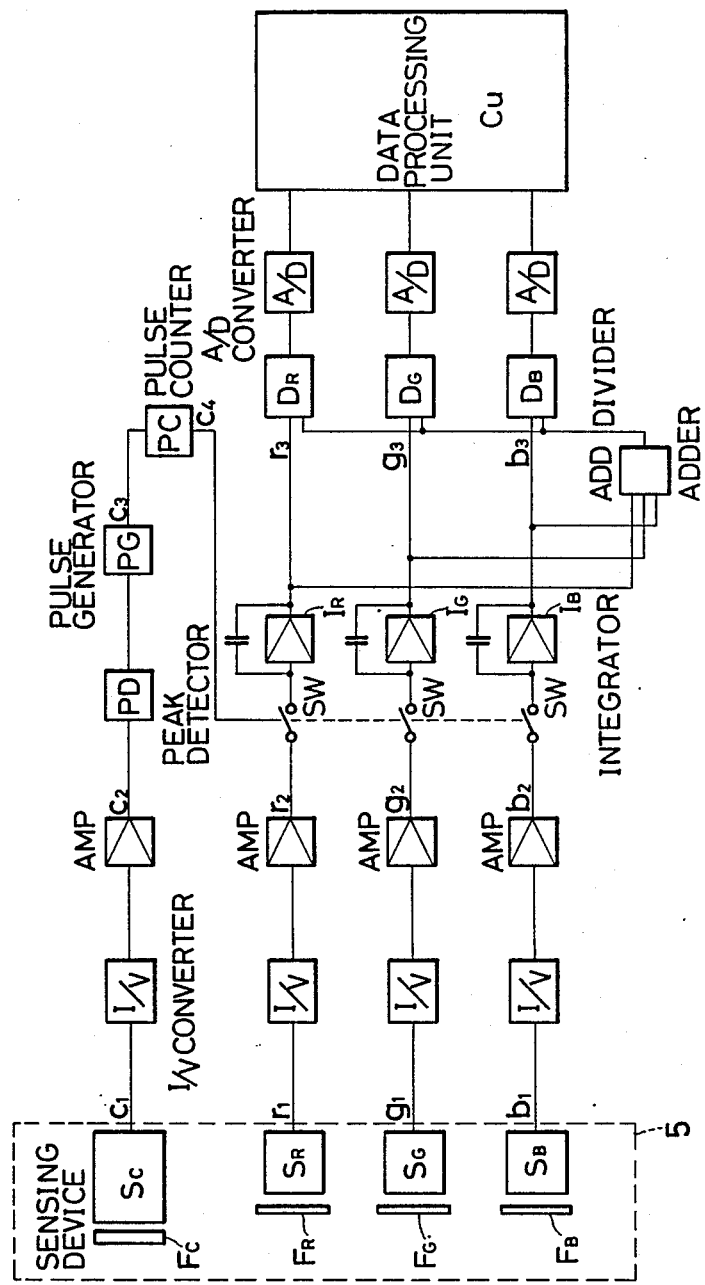
FIG. 3 is a block diagram of the color sensor according to the present invention.

The light having entered the respective optical sensing devices is converted into an electric current, which is fed to an electronic circuit 7. That is, as shown in FIG. 3, each of the optical sensing devices $S_R$, $S_G$, $S_B$ and $S_C$ is connected to a current-voltage converter I/V which is connected to an amplifier AMP. The output signals $r_1$, $g_1$ and $b_1$ of the optical sensing devices are converted into voltage signale $r_2$, g and $b_2$ by the current-voltage converters I/V and these voltage signals are fed to integrators $I_R$, $I_G$ and $I_B$ through switches SW which will be described later.

On the other hand, the output current signal c of the complementary optical sensing device $S_C$ is converted into a voltage signal $c_2$ in the current-voltage converter I/V and then fed to a peak detector PD for detecting a peak value of brightness due to flicker of the fluorescent lamp 1. A pulse generator PG for generating a pulse $c_3$ is connected to the detector PD so that the detection of the peak value of the signal received by the detector PD is in synchronism with the generation of the pulse $c_3$. Further, a pulse counter PC for outputting $c_4$ one pulse per two pulses upon receipt of the output $c_3$ of the pulse generator PG is provided. By the pulse $c_4$ from the pulse counter PC, the switches SW are controlled so as to start the integrating operation of the integrators $I_R$, $I_G$ and $I_B$.

After passing through the integrators $I_R$, $I_G$ and $I_B$, the outputs $r_3$ and $b_3$ of the respective primary optical sensing devices are added in an adder ADD to obtain a total value of $r_3$, $g_3$ and $b_3$, and the output of the adder ADD is fed to analog dividers $D_R$, $D_G$ and $D_B$ so as to calculate the composition ratios with respect to the respective outputs $r_3$, $g_3$ and $b_3$. The respective analog dividers $D_R$, $D_G$ and $D_B$ calculate the following relations:

$$R = r_3/(r_3+g_3+b_3)$$

$$G = g_3/(r_3+g_3+b_3)$$

$$B = b_3/(r_3+g_3+b_3)$$

and obtain the relative composition ratio of the three primary colors. The outputs R, G and B are fed to a data processing unit Cu through respective analog-digital converters A/D to make a color distinction.

The data processing unit Cu has beforehand stored each standard color, a relative ratio of the compositions R, G and B of each standard color and each tolerance range. It is determined that the relative composition of the outputs R, G and B from the dividers $D_R$, $D_G$ and $D_B$ fall within what color of tolerance range stored, and then the color of the object to be distinguished is identified.

The object includes not only colored articles but also bar codes having various colors.

In the color sensor having the above-mentioned construction, the respective outputs $R_2$, $g_2$, $b_2$ and $c_2$ of the amplifiers AMP connected to the respective optical sensing devices $S_R$, $S_G$, $S_B$ and $S_C$, as shown in FIG. 4, are the same in time $t_1$, $t_3$ for generating the upper limit value and in time $t_0(=t_4)$, $t_2$ for generating the lower limit value under a fluorescent lamp. Where a current of 50 Hz is supplied to the fluorescent lamp, one cycle ($t_0$ through $t_4$) is 20 ms, and the time for distinguishing a color is the sum of one cycle of the lamp, time delay of the circuit, and calculating time. The output $c_1$ of the complementary optical sensing device element $S_C$ having a waveform shown in FIG. 5(a) is input into the peak detector PD through the current-voltage converter I/V and amplifier AMP, and the maximum value of the brightness of the fluorescent lamp is detected in the peak detector PD. When the maximum value of the brightness is detected in the peak detector PD, a trigger pulse shown in FIG. 5(b) is generated from the pulse generator PG.

In this case, when a current of 50 Hz is supplied to the fluorescent lamp for example, the waveform has 100 brightness peaks whose values are alternately the same. Therefore, the pulse counter PC outputs one pulse every time two pulses are input thereto and, as a result, a trigger pulse which is in synchronism with the flicker of the fluorescent lamp can be obtained.

Why one pulse is output every time two pulses are input in the pulse counter PC is that one cycle comprises two pulses having different peak values as shown in FIG. 4 and that if an "ON"/"OFF" operation is performed per pulse, the difference between the two peak values is output, thereby failing to obtain a perfect direct current.

The outputs $r_1$, $g_1$ and $b_1$ of the respective primary optical sensing devices $S_R$, $S_G$ and $S_B$ like the complementary optical sensing device $S_C$ are fed to the amplifiers AMP through the respective current-voltage converters I/V, and further to the integrators $I_R$, $I_G$ and $I_B$ through the switches SW. However, since the switches SW are controlled by the trigger pulse from the pulse counter PC, that is, since the switch SW is put on and off per cycle of FIG. 4, the voltage output signals $r_2$, $g_2$ and $b_2$ from the optical sensing devices are fed to the integrators $I_R$, $I_G$ and $I_B$ per cycle. In the respective integrators, the input for one cycle portion is integrated. As a result, a smooth waveform without noise is obtained as shown in FIG. 5(c).

After processed in the integrators $I_R$, $I_G$ and $I_B$, the smooth output signals $r_3$, $g_3$ and $b_3$ are added in the adder ADD before taken into the data processing unit, etc., then the relative composition ratio with respect to the respective outputs $r_3$, $g_3$ and $b_3$ is calculated based on the above-mentioned relations in the analog dividers $D_R$, $D_G$ and $D_B$, and then is input into the data processing unit Cu to be served as a color distinction item, thereby to make the color distinction at very high speed.

As described in the foregoing, if the timing for generating a trigger pulse is determined by the peak value of the complementary optical sensing device with respect to a light source having a flicker such as a fluorescent lamp, information without apparent flickers of a fluorescent lamp can be obtained. As a result, a color distinction can be accurately made at high speed.

In the circuitry of FIG. 3, it takes the longest time for processing the divider. If a commercially available divider is employed, it takes about 10 μs. Therefore, a sufficient processing can be performed following the flicker (50 Hz, 60 Hz and 400 Hz) of a fluorescent lamp and a correct color information can be supplied to the data processing unit at high speed. Therefore, a high speed color distinction can be performed in that only about 30 ms is required for processing even under a fluorescent lamp lighting at a commercial frequency of 50 Hz, compared with 1 to 2 seconds required in the prior art.

If the time for taking in, for example, 4 channel portions can be shortened to about 10 through 20 μs in the high speed AD converter, all circuits after the peak detector and integrator can be replaced with software.

In a bar code system, a monochrome bar code has been used. According to this invention, since color distinction can be made at high speed by a color sensor under a fluorescent lamp, the bar code can have various colors. Therefore, a large amount of complicated information can be processed at high speed.

What is claimed is:

1. A color sensor comprising:
    three optical filters each having a peak in wavelength of three primary colors;
    three primary optical sensing devices for receiving light passed through said optical filters;
    three integrators for integrating outputs from said primary optical sensing devices;
    a complementary optical sensing device sensitive to visible light;
    control means comprising a peak detector and a pulse generator for controlling the operation of said three integrators, said peak detector detecting a peak value of light from a light source having a flicker from an output of said complementary optical sensing device, said pulse generator controlling the operation of said three integrators by a pulse signal generated based on the peak value detected so that the integrating operation is performed during the generation of the peak value;
    means for calculating a composition ratio of the three primary colors on the basis of outputs from said three integrators; and
    means for distinguishing color by comparing the composition ratio obtained of the three primary colors with each composition ratio of three standard primary colors stored beforehand.

2. The color sensor according to claim 1 wherein each of said optical sensing devices is a PIN photodiode.

* * * * *